Oct. 3, 1944.                  D. F. DALY                    2,359,628
                    PROTECTIVE COVER FOR ELECTRIC METERS
                           Filed July 22, 1942
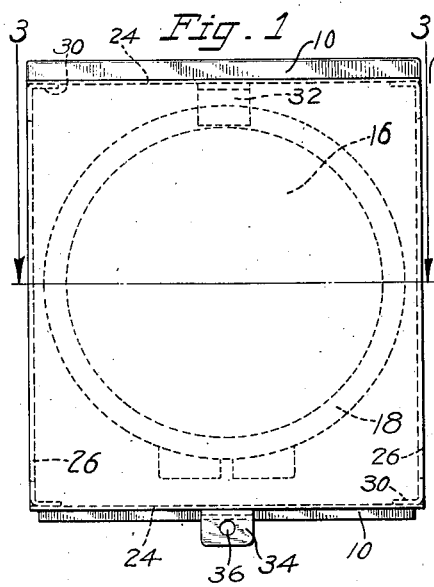
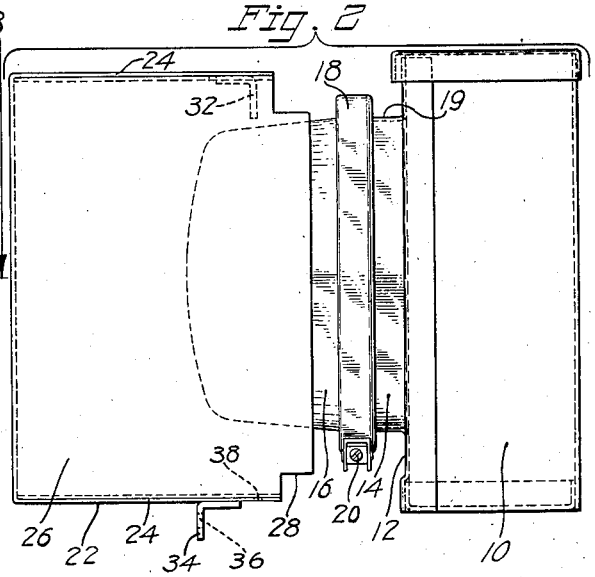
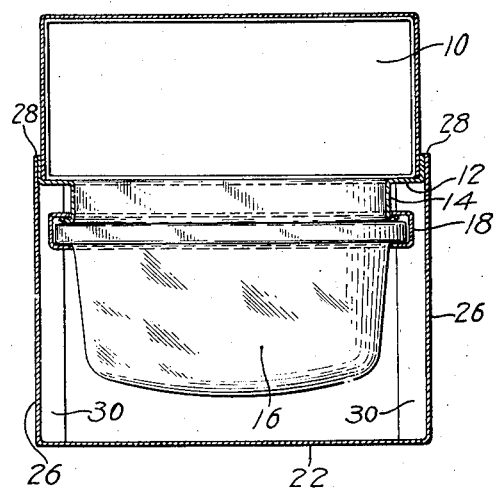
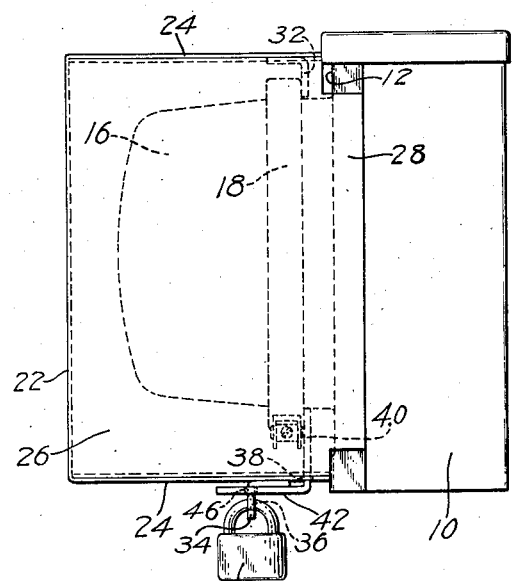
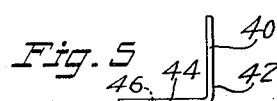
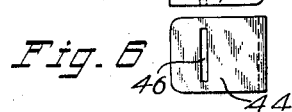
Inventor
Daniel F. Daly
By S. Jay Teller
Attorney Patented Oct. 3, 1944

2,359,628

UNITED STATES PATENT OFFICE 2,359,628

PROTECTIVE COVER FOR ELECTRIC METERS

Daniel F. Daly, Hartford, Conn., assignor, by mesne assignments, to Federal Electric Products Company, Inc., Newark, N. J., a corporation of New Jersey Application July 22, 1942, Serial No. 451,923

6 Claims. (Cl. 220—24)

This invention relates to a protective cover for electric meters and more particularly for the frangible enclosure usually provided on electric meters to prevent breakage of the frangible enclosure by stones or other objects being thrown against the same.

It has been found that in certain localities where outdoor electric meters having glass meter enclosures or covers are installed, the enclosures present tempting targets for small boys to endeavor to break with stones and it is an object of the present invention to provide a non-frangible protective cover to enclose the frangible glass meter enclosure and be secured over the same by means provided on the non-frangible protective cover which means are adapted to cooperate with various elements existing on the standard construction of the meter and meter casing whereby the construction of the meter and meter casing need not be changed in any way in order to adapt and secure the non-frangible protective cover thereto.

Another object of the invention is to provide disconnectible means for locking the protective cover on the meter enclosure and casing, said locking means being secured in locked position by a padlock or other suitable means which may be unlocked by proper individuals when it is desired to remove the protective cover and read the meter.

The details and other objects of the invention are set forth in the following specification illustrated in the attached drawing.

The accompanying drawing shows the embodiment of the invention which is deemed preferable, but it will be understood that the drawing is intended for illustrative purposes only and is not to be construed as defining or limiting the scope of the invention, the claims forming a part of this specification being relied upon for that purpose.

In the drawing,

Fig. 1 represents a front elevation of the protective cover mounted over the meter enclosure and meter casing.

Fig. 2 is a side elevation of the meter enclosure and meter casing and also the protective cover shown at one position during the operation of placing the protective cover over the meter.

Fig. 3 is a sectional plan view on the line 3—3 of Fig. 1 and shows the manner in which the sides of the protective cover overlap opposite sides of the meter casing to position the protective cover thereon.

Fig. 4 is a side elevation similar to Fig. 2 but showing the protective cover mounted over the meter enclosure in fully enclosing position with the securing means of the protective cover engaging elements of the meter enclosure to retain the protective cover thereon.

Figs. 5 and 6 are respectively side and end elevations of a movable locking member by which the protective cover is locked on the meter enclosure.

The electric meter structure which is desired to be protected by the cover comprising the present invention consists of a meter casing having a front panel formed with an annular flange to which a glass meter enclosure is secured by an annular collar which engages the outer edge of the annular flange of the front panel and the annular rim of the glass enclosure, the collar usually being locked in position by a seal in order to prevent tampering with the meter. The annular collar extends laterally from the sides of the glass enclosure, thus providing an annular recess rearward of said collar.

The preferred embodiment of the protective cover forming the present invention comprises a metallic box-like member open at one side and provided with projecting flanges on the free edges of two opposed sides of the box, said flanges being adapted to respectively overlie opposed sides of the meter casing to position the cover in one direction on the meter enclosure and casing when the cover is mounted thereon.

The protective cover is also provided with a securing member depending from the upper side thereof, which securing member is adapted to be placed in the upper portion of said annular recess to secure the top of the protective cover in proper position over the enclosure.

The lower side of the protective cover is provided with a slot adapted to receive one leg of a right angled locking member, said leg being adapted to be disposed in the lower portion of said annular recess to secure the lower portion of the protective cover in operative position on the meter enclosure. The locking member is also provided with a slot adapted to receive a locking ear depending from said lower side of the protective cover. Said locking ear is apertured to receive a padlock which secures the locking member in locked position and prevents removal of the protective cover from the meter enclosure.

Said locking and securing members not only prevent removal of the protective cover from the meter enclosure in a direction away from and normal to the panel to which the meter enclosure is secured but they also position the protective cover in a direction transverse to that in which the projecting flanges position the protective cover.

Referring to the drawing, a meter casing 10 is provided with a front panel 12 having an annular flange 14 projecting outward therefrom to provide a seat for the frangible glass meter enclosure 16. The meter structure per se is not illustrated in order to simplify the present drawing but it will be understood that the meter mechanism comprises a conventional electric meter which is normally housed in the type of meter enclosure and meter casing illustrated in the drawing. An annular collar 18 provided with an inward extending groove surrounds the rims of the glass enclosure 16 and annular flange 14 to secure the enclosure to the flange. As clearly shown in Figs. 2 through 4, the collar 18 projects laterally with respect to the meter enclosure 16 to define an annular groove or recess 19 rearward of the collar and immediately forward of the panel 12. The collar is preferably split and the free ends are secured in locked position by any suitable means such as a bolt 20 which may subsequently be sealed against removal.

The protective cover 22 is preferably formed of non-frangible material such as sheet metal and comprises a box-like member having one open face defined by opposed pairs of sides 24 and 26, the sides 26 each having projections 28 extending outward beyond the free edges of the sides 24. The projections 28 are adapted to respectively overlie opposed sides of the meter casing 10 as shown in Fig. 3 to position the protective cover on the meter enclosure and meter casing in one direction when the protective cover is mounted thereon. The adjacent edges of sides 24 and 26 are secured to each other by suitable means such as angular flanges 30 which are affixed to the respective adjacent sides by spot welding or any other suitable means.

A right angled securing means 32 is suitably fastened to the upper wall 24 of the protective cover so as to have one leg thereof project downward to provide a detent adapted to be received in the upper portion of the annular groove or recess 19 to secure the upper part of the protective cover in assembled or operative position on the meter enclosure and casing.

A right angled member is secured to the lower side 24 of the protective cover and has one leg depending from the side of the cover to provide a locking ear 34 having an aperture 36 for purposes to be described.

The lower side 24 is also provided with an opening or slot 38 adjacent the free edge of said side for purposes of receiving one leg or portion 40 of a right angled locking member 42. The portion 40 is of sufficient length that, when projected through the slot 38, it will be disposed in the lower portion of the recess 19 to secure the lower part of the protective cover in operative position on the meter enclosure and casing.

The other leg 44 of the locking member 42 is provided with an opening or slot 46 adapted to receive the locking ear 34 when the portion 40 is in the operative position illustrated in Fig. 4. When the locking member 42 is in operative position, a padlock 37 or other suitable means is passed through the aperture 36 of the locking ear 34 to prevent removal of the locking member 42 from the recess 19.

It will thus be seen that the securing member 32 and the locking member 42, when in operative position as illustrated in Fig. 4, not only prevent removal of the protective cover in a direction normal to the plane of the panel 12 but they also position the protective cover in a direction transverse to that in which the projections 28 position said cover.

The present invention thus provides a simple and durable protective cover which is adapted to be readily mounted on a meter casing for protecting the frangible glass enclosure thereof, the protective cover being provided with locking means for quickly securing the protective cover in operative protecting position over the meter enclosure in such a manner that the protective cover may be readily removed when it is desired to read the meter.

The terms used throughout the foregoing specification to indicate position or direction such as upper, lower, forward, rearward and the like, are used in a sense relative to the position of the protective cover, the meter enclosure, and meter casing when mounted in the position shown in Figs. 1, 2 and 4, and particularly when the side of the meter casing opposite the panel 12 is mounted in a vertical position against a wall or other supporting means whereby said side opposite the panel 12 may be considered the back of the meter casing. It is to be understood that the meter casing and meter enclosure may be mounted in other positions than that shown in said figures but the descriptive terms referred to above are to be considered relative to the position of said casing and enclosure shown in the present figures of the drawing regardless of any other position in which the casing and enclosure may be mounted.

Furthermore, the term electric meter mechanism as used in the foregoing and in the following claims is intended to include meters and/or switches such as watt-hour meters, combination watt-hour meter and time switch, time switches for changing the rate in accordance with different hours of the day and night, and any other similar meter and/or switch. While the term is not to be so restricted, it is particularly intended to apply to socket type meters and/or switches of the class defined above.

While the invention has been illustrated and described in its preferred embodiment and has included certain details, it should be understood that the invention is not to be limited to the precise details herein illustrated and described since the same may be carried out in other ways, falling within the scope of the invention as claimed.

What I claim is:

1. A protective cover for an electric meter mechanism of the type mounted on a panel of a meter casing and enclosed in a frangible member projecting forward from said panel and connected to the panel by means providing a recess extending around the frangible member adjacent said panel and directed substantially transversely inward, said cover comprising in combination, a non-frangible enclosure adapted to be mounted over said frangible member to cover the same, securing means projecting inward from one wall of said enclosure and adapted to be disposed in said recess, and a locking member movable with respect to said enclosure and having a portion adapted to extend inward of the enclosure and be disposed in said recess at a position substantially opposite from that of the securing means, said locking member cooperating with said securing means to prevent removal of said enclosure from said frangible member.

2. A protective cover for an electric meter mechanism of the type mounted on a panel of a meter casing and enclosed in a frangible member projecting forward from said panel and connected to the panel by a collar having a surface extending laterally from the frangible member and spaced from the panel to provide a recess directed substantially transversely inward and extending around and rearward of the collar, said cover comprising in combination, a non-frangible enclosure adapted to be mounted over said frangible member to cover the same, securing means projecting inward from one wall of said enclosure and adapted to be disposed in said recess, and a locking member movable with respect to said enclosure and having a portion adapted to extend inward of the enclosure and be disposed in said recess at a position substantially opposite from that of the securing means, said locking member cooperating with said securing means to prevent removal of said enclosure from said frangible member.

3. A protective cover for an electric meter mechanism of the type mounted on a panel of a meter casing and enclosed in a frangible member projecting forward from said panel and connected thereto by means providing a recess extending around the frangible member adjacent said panel and directed substantially transversely inward, said cover comprising in combination, a non-frangible open sided box adapted to be mounted over said frangible member to cover the same, securing means projecting inward from one wall of said box and adapted to be disposed in said recess, a locking member having a portion movable relatively to another wall of said box and into said recess at a position substantially opposite that where the securing means is located therein, said locking member when said portion thereof is disposed in said recess cooperating with said box and securing means to prevent removal of said box from said frangible member, and means on said box cooperating with said locking member to maintain the same in locked position.

4. A protective cover for an electric meter mechanism of the type mounted on a panel of a meter casing and enclosed in a frangible member projecting forward from said panel and connected thereto by means providing a recess extending around the frangible member adjacent said panel and directed substantially transversely inward, said cover comprising in combination, a non-frangible open sided box adapted to be mounted over said frangible member to cover the same, securing means projecting inward from one wall of said box and adapted to be disposed in said recess, another wall of said box having an opening located substantially oppositely to said securing means, a locking member having a portion movable through said opening provided in said another wall of said box and into said recess at a position substantially opposite that where the securing means is located in said recess, said locking member cooperating with said securing means to prevent removal of said box from said frangible member, and means on said box cooperating with said locking member to maintain the same in locked position.

5. A protective cover for an electric meter mechanism of the type mounted on a panel of a meter casing and enclosed in a frangible member projecting forward from said panel and connected thereto by means providing a recess extending around the frangible member adjacent said panel and directed substantially transversely inward, said cover comprising in combination, a non-frangible open sided box adapted to be mounted over said frangible member to cover the same, one wall of said box having an opening therein, a securing member projecting inward from one wall of said box and located substantially oppositely to the opening in said first mentioned wall, said securing member being adapted to be disposed in said recess, a locking member having a portion movable through the opening provided in said first mentioned wall of said box and into said recess at a position substantially opposite that where the securing member is located in said recess, said locking member cooperating with said securing member to prevent removal of said box from said frangible member in a direction normal to the meter casing panel and also prevent movement of the box in one direction substantially parallel to the plane of said meter casing panel, and positioning members projecting from opposite sides of said box and adapted to respectively engage opposite sides of said meter casing to prevent movement of the box with respect to the meter casing in a direction planar to and transverse to said one direction.

6. A protective cover for a frangible electric meter enclosure mounted on and secured to a meter casing by a collar surrounding the frangible enclosure and projecting laterally therefrom in spaced relationship with the meter casing to define a recess rearward of and extending around the frangible enclosure, said cover comprising a non-frangible box having the free edges of two opposed sides projecting beyond the free edges of the other sides of the box and adapted to engage opposite sides of said meter casing to position the box thereon in one direction, a securing detent projecting from the inner surface of one of the shorter sides of the box and adapted to be disposed in said recess, an apertured ear projecting from the outer surface of the other short side of the box, said latter side also having an opening therethrough adjacent said ear, and a slotted locking member having a portion adapted to extend through said opening in the side of the box and into said recess to cooperate with said securing detent to maintain the box in locked position over the frangible enclosure and position the box on the meter casing in a direction transverse to said first named direction, the slot of said locking member receiving said apertured ear when the locking member is in locked position on the box and in which locked position the locking member is adapted to be maintained by a padlock disposed in the aperture of said ear.

DANIEL F. DALY.